Sept. 6, 1960   R. E. TOMPKINS ET AL   2,951,569
ELECTROMAGNETIC CLUTCH
Filed April 26, 1957
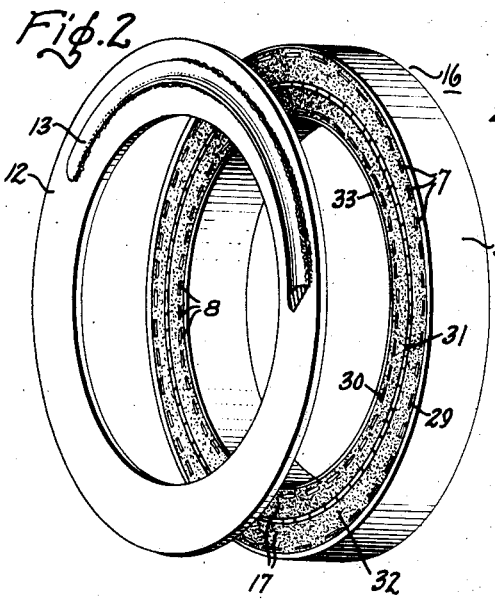
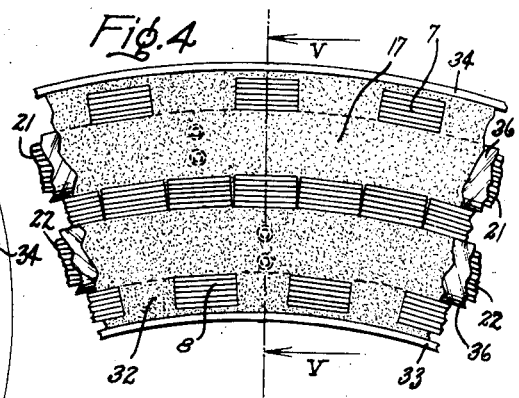
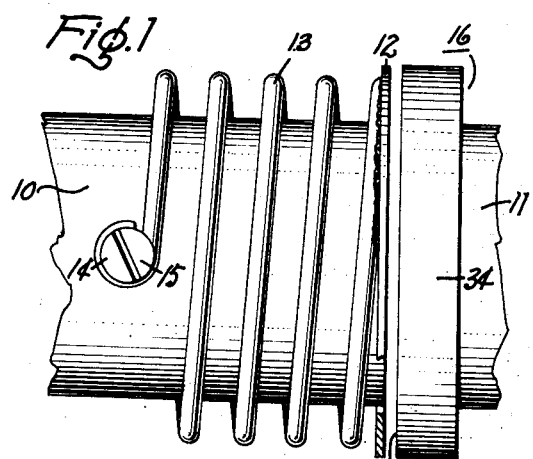
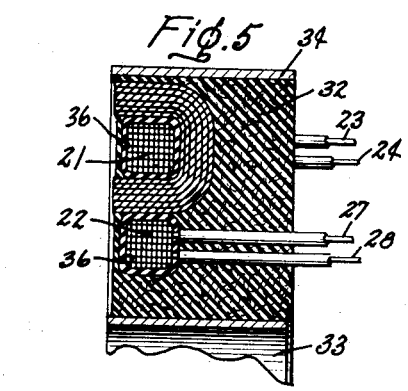
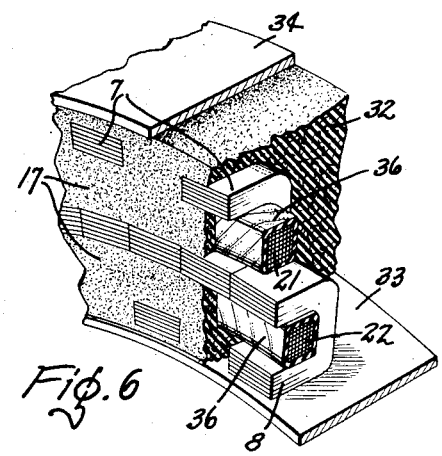
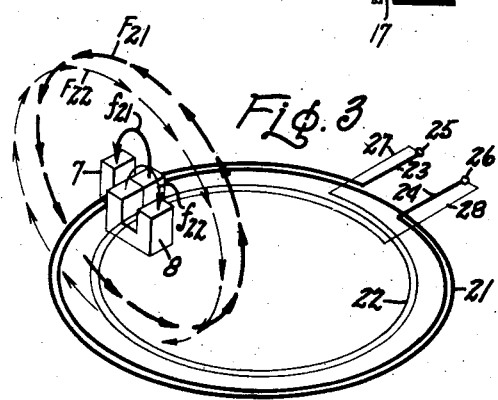
Inventors:
Russell E. Tompkins
Robert F. Edgar
by Merton D. Moore
Their Attorney

2,951,569
ELECTROMAGNETIC CLUTCH

Russell E. Tompkins and Robert F. Edgar, Schenectady, N.Y., assignors to General Electric Company, a corporation of New York Filed Apr. 26, 1957, Ser. No. 655,284

5 Claims. (Cl. 192—84)

This invention relates to magnetic clutches and more particularly to electromagnetic clutches of the kind having an electromagnet or electromagnets arranged, on energization, to effect engagement of the clutch members to couple working parts. The particular electromagnetic clutch described herein is especially useful for applications wherein engagement and disengagement of the clutch members must be extremely fast.

It is to be particularly understood that the term clutch where used in this description is not limited to a device for bringing a driven and a driving member into torque transmitting relationship but also includes such devices for coupling a moving member to a stationary member to perform a braking function.

In many applications involving the use of electromagnetic clutches it is essential for proper operation that the clutch shall engage as soon as the controlling circuit is energized and disengaged immediately upon deenergization of the controlling circuit. Engagement of the clutch members is caused by magnetic flux from the electromagnet assembly attracting an armature member and disengagement is dependent upon the release of the armature member when there is no such magnetic flux. Therefore, in order to obtain a fast acting electromagnetic clutch member, the magnetic flux must build up and decay substantially instantaneously upon energization and deenergization of the electromagnet. The problem involved in obtaining quick flux build up and decay is twofold. First, such action is dependent upon the quick build up and decay of the actuating current for the clutch electromagnet and, secondly, such action is dependent upon the resultant clutch-actuating electromagnetic flux build up and decay following the current build up and decay with a minimum time lag.

In order to minimize the current rise and decay time in the coil of the electromagnet assembly, the inductance of the coil must be reduced to a minimum and the resistive component of the circuit impedance should be high in comparison thereto. In order to make the clutch-actuating flux build up and decay follow the current build up and decay with a minimum of time lag, the magnetic circuit of the electromagnetic clutch must have an extremely low residual flux density and coercive force, and eddy currents inter-linking the flux paths of the magnetic circuit should be reduced to an absolute minimum.

Accordingly, it is one object of this invention to provide an electromagnetic clutch wherein the clutch members will be immediately engaged upon energization of the clutch member.

Another object of this invention is to provide such a clutch wherein the clutch members will be immediately released as soon as the energizing winding is de-energized.

The function of the particular embodiment of the clutch illustrated herein is to couple axially aligned driving and driven shafts. For such an arrangement it is most convenient to have the electromagnet assembly generally of a cylindrical configuration surrounding the end of one rotatable shaft member and in reasonably close proximity to the end of the opposite rotatable shaft. With this arrangement it is difficult magnetically to isolate the rotatable shaft ends from the magnetic circuit of the electromagnet. This isolation is necessary, otherwise the flux set up by the electromagnet sets up eddy currents in the rotatable shafts. As previously indicated, such eddy currents prevent the magnetic flux rise and decay from following the current rise and decay instantaneously and make the clutch action sluggish.

One means of eliminating or minimizing flux linkage between the rotatable shaft ends and the electromagnet has been to make the clutch magnet assembly of a plurality of individual electromagnets. This method reduces flux linkage between the solenoid and shaft but does not entirely eliminate the problem. In addition, the multiplicity of individual magnetic coils required for such an arrangement results in an extremely high circuit inductance. The high circuit inductance results in a slow current build up and decay in the circuit and this defeats the purpose of utilizing the individual electromagnets.

Another electromagnet arrangement which has been suggested to make the clutch fast acting includes an annular electromagnet having a ring of magnetic material with a U-shaped radial cross section and a multiple turn annular energizing coil positioned between the legs of the U-shaped magnetic material. The ring shaped electromagnet is then positioned around one rotatable shaft end. Energization of the coil causes flux to pass through the magnetic material in such a manner that the legs of the U-shaped member constitute pole pieces of the electromagnet. The pole pieces are then used to attract an armature on an opposite rotatable shaft to complete the clutch coupling. This arrangement provides a similar result to that obtained with the electromagnetic clutch having a plurality of individual electromagnets described above but does not require such a large number of coil turns. Since fewer coil turns are required, both the resistance and the inductance of the coil are comparatively low but this advantage is offset by the fact that the magnetic circuit surrounding the coil includes the ends of the driving and driven shafts. Consequently, the coil sets up eddy currents in the shafts as well as the magnetic ring. These eddy currents inter-link the flux paths and prevent the flux rise and decay from following the rise and decay of the current as closely as is necessary to obtain the required fast action.

Accordingly, it is a further object of this invention to provide a fast acting electromagnetic clutch wherein the flux from the clutch member is restricted in large measure to the clutch members themselves.

In accomplishing these objects an electromagnetic clutch having a magnet assembly and an armature member is provided and the magnetic flux which is utilized to actuate the clutch is confined to the clutch members themselves. This flux concentration is effected by providing a pair of annular concentric magnetic circuits having low residual density and low coercive forces arranged in such a manner that forces of both magnetic circuits are made additive between the two concentric circuits and tend to cancel both inside and outside the pair of magnetic circuits.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing in which:

Figure 1 is a side elevation of the electromagnetic clutch member assembled on a pair of axially aligned shafts which are to be coupled thereby;

Figure 2 is an exploded perspective view of the electromagnetic clutch members removed from the driving and driven shafts;

Figure 3 is a diagrammatic view illustrating schematically the electrical coil members and part of the magnetic circuit of the solenoid along with flux lines of force produced thereby;

Figure 4 is a front elevational view of a section of the electromagnet member;

Figure 5 is a vertical longitudinal section taken through the solenoid along the section lines V—V of Figure 4; and Figure 6 is a perspective view of a segment of the solenoid broken away to expose component parts thereof.

The general construction of the clutch and its associated apparatus may best be understood by specific reference to Figures 1 and 2 of the drawing. In the arrangement illustrated in Figure 1, the clutch forming the subject of this invention is intended for use in transmitting the rotary motion or torque between a pair of axially aligned shafts 10 and 11. Either of the two shafts may be the driving shaft; however, shaft member 10 is considered the driving shaft for purposes of this description. In order to transmit or couple the two shafts for transmitting torque therebetween, the driving shaft 10 is provided with a driving clutch plate or armature 12 which consists of a flat annular ring of magnetic material and the driven shaft 11 is provided with an electromagnet assembly 16 which is annular in shape. The configuration of the armature 12 and electromagnet assembly 16 are most clearly illustrated in Figure 2.

A connection between armature 12 and the driving shaft 10 is provided by a helical spring member 13. One end of the helical spring member 13 is welded to the armature 12, the opposite end is provided with an eye 14 for receiving a screw or bolt 15 which secures the spring 13 to the driving shaft 10. By connecting armature 12 to the driving shaft 10 in this manner, it is positioned around the end of the driving shaft 10 so that there is a slight clearance therebetween and in such a manner that the central axis of the annular clutch plate coincides precisely with the longitudinal axis of the driving shaft 10.

It is obvious that the configuration of the driving clutch plate 12 and the manner in which it is secured to driving shaft 10 is not crucial to the present invention. The important point is that one of the clutch members be arranged so that it may move longitudinally along the shaft member to couple the two shafts for driving purposes and that some means be provided to allow some coupling resilience to prevent "fierce" seizing of the members. Connecting the armature 12 to the driving shaft 10 by means of spring 13 accomplishes both of these results. As may be seen most clearly by reference to Figure 2, the electromagnet assembly 16 is generally annular in shape. The hollow central portion of the electromagnet assembly is preferably of such a size that it fits snugly around the end of the driven shaft 11 and may be secured thereto by some means such as welding or shrink fitting. Obviously, the electromagnet assembly 16 may be fixed to the shaft by other means, such as by spiders but it has been found most convenient to make it of a size that it can be welded directly to the driven shaft 11.

In operation, coupling between the driving and driven shafts 10 and 11 is established by energizing the electromagnet assembly 16 thereby providing an attractive force which pulls the armature 12 into engagement with the front surface 17 of the electromagnet assembly 16. Thus, torque or rotary motion may be transmitted from the driving shaft 10 to the driven shaft 11.

As was previously indicated, the particular clutch shown and described herein was developed to meet the requirements for an extremely quick acting clutch so that two members such as rotatable shafts 10 and 11 may be coupled and de-coupled in the shortest possible time. Also, as was previously indicated, fast clutching action cannot be obtained unless changes in current flow in the electrical circuit of electromagnet assembly 16 of the clutch occur freely and rapidly and unless the magnetic flux build up and decay follows the current as closely as possible.

These results are accomplished by utilizing two concentric coils 21 and 22 in the clutch electromagnet assembly 16 and, as illustrated in Figure 3, winding and energizing these coils in such a manner as to produce electromagnetic flux lines of opposite rotation around each coil. For example, the outer coil member 21 is wound in one direction; i.e., counter-clockwise, and inner coil member 22 is made concentric with the outer coil member 21 and its turns are wound in the opposite direction; i.e., clockwise. The leads 23 and 24, and 27 and 28, respectively, of the two coils are connected to a pair of terminals 25 and 26. Terminals 25 and 26 are connected to be energized from a unidirectional voltage source (not shown). If the polarity of the voltage source is such that terminal 25 is positive with respect to the terminal 26 the magnetic lines of force caused by the current flowing through this coil will come up through the internal portion of the coil and down around the external portion of the coil as illustrated by the lines of force $F_{21}$. Current flow through the oppositely wound internal coil 22 produces magnetic lines of force around the turns of the coil which come up from outside of the coil member and down inside the coil member as illustrated by the lines of force $F_{22}$. Since the lines of force both inside and outside of the two coils 21 and 22 are of opposite rotation, they oppose each other and are substantially cancelled, whereas the lines of force between the two coils aid each other and are consequently much stronger.

The lines of force around each of the coils may be concentrated in the area of the coil by placing a magnetic path of relatively high magnetic permeability (low reluctance) around a portion of each coil; for example, C-cores 7 and 8, respectively, may be placed around a portion of the outer and inner coils 21 and 22, respectively. According to convention the flux lines come up out of the legs of the C-cores 7 and 8 which are between the two coils 21 and 22, down into the opposite legs of these two cores as shown by flux lines $f_{21}$ and $f_{22}$ respectively. In other words, the flux lines $f_{21}$ which surround outer coil 21 enter the leg C-core 7 which is outside the two coils whereas the flux lines $f_{22}$ which surround inner coil 22 enter the leg of C-core 8 which is inside the two coils. Thus, the legs of the two C-cores 7 and 8 which are between the two coil members form or terminate in magnetic north poles and the opposite two legs of these two cores form or terminate in magnetic south poles.

In order to make practical use of the properties just described in an electromagnet assembly for the clutch, a plurality of C-cores 7 and 8 (the outer C-cores are given the reference numeral 7 and the inner C-cores are given the reference numeral 8) are arranged in two concentric circles in such a manner that the legs of the C-cores form three concentric circles 29, 30 and 31 (see Figure 2). In other words, the C-cores are staggered with first one C-core forming a part of the outer circle and the next C-core forming a part of the inner circle and their adjacent legs are positioned in such a manner that they form one substantially continuous circle 31 whereas the outer and inner circles 29 and 30 as formed by the legs are made up of spaced-apart legs. Stated in another way, it may be said that the C-cores are arranged in two concentric circles and staggered in an allochiral manner.

In order to hold the cores 7 and 8 in the position described above, they are embedded in a non-conducting, non-magnetic plastic compound 32 between two brass rings 33 and 34. The brass rings are spaced apart with the inner brass ring 33 being of such a size that it just fits around the rotatable shaft 11 and the outer brass ring 34 being of such a diameter that it is spaced from the inner brass ring by a distance sufficient to contain the two concentric circles of C-cores with a slight clearance. The two rings 33 and 34 are of brass as a matter of convenience. The rings are preferably of a non-magnetic material, they should be strong enough to hold the plastic composition and magnets 7 and 8 together while they are subjected to stresses caused by rotation forces and the frictional engagement of the clutch armature 12 with the front face 17 of the electromagnet assembly 16, and the inner ring 33 is preferably of a material which can be secured to the rotatable shaft 11 by welding or shrinking.

The two coils 21 and 22 are cradled in the circular channels of U-shaped cross section formed between the inner and outer legs of each of the inner and outer sets of C-cores 8 and 7 respectively. As may best be seen from Figures 4, 5, and 6, these coils are multi-turn, they are wrapped with an electrical insulating material 36 and then impregnated and cemented into the channels in the core members 7 and 8 as described above. In the preferred arrangement, the plastic compound 32 is then flowed into the remaining space in the C-cores 7 and 8 to cover the coils and help hold them in place.

The leads 23, 24, 27 and 28 of outer and inner coils 21 and 22, respectively, are then brought out in back of the plastic compound to any suitable current collectors or to supply terminals (not shown). The particular clutch shown and described was not required to rotate through an angle greater than 180° and, therefore, it was not necessary to utilize collectors; however, it will be appreciated that any type of slip rings or other suitable collectors may be used to connect an energizing potential to the coil members.

When the coils 21 and 22 of the electromagnet assembly 16 are connected to be energized as illustrated in Figure 3, the C-cores 7 and 8 all form magnets as discussed with respect to that figure. The outer and inner concentric circles of core legs 29 and 30, respectively, are all south magnetic poles while the core legs which form the circle 31 which is located between these circles are all magnetic north poles. Thus, the electromagnetic assembly 16 provides a uniform attractive force around its entire periphery when coils 21 and 22 are energized. This attractive force causes engagement of the two clutch members.

In addition to the advantages of flux concentrating functions of the C-cores 7 and 8, the particular arrangement utilized has a number of other advantages. For example, utilizing a plurality of C-core members for each of the two concentric magnetic circuits in large measure eliminates eddy currents inter-linking flux paths which would accompany the use of an annular ring or rings of magnetic material. As a consequence, the use of the C-core arrangement illustrated has the advantage of allowing the flux changes of electromagnet assembly 16 to follow current changes with a minimum of time lag. This effect is further enhanced by making the cores of laminated silicon steel chosen for its low coercive force and low residual flux density.

Armature 12 is illustrated as having approximately the same inner and outer radii as the face 17 of the electromagnet assembly 16. In order that the armature have a minimum inertia, it is constructed of a single ring of silicon steel which is as thin as is consistent with the required mechanical rigidity and magnetic flux carrying capacity. In view of the fact that the armature 12 can be made quite thin, it was not deemed feasible to make it laminar. However, if a greater thickness is required the armature should be laminated to minimize eddy current linkage of magnetic flux paths.

While a particular embodiment of the invention has been shown and described it will, of course, be understood that it is not limited thereto since many modifications both in the physical and circuit arrangements and in the instrumentalities employed may be made. It is contemplated that the appended claims will cover any such modifications as fall within the true spirit and scope of the invention.

What we claim as new and desire to secure by Letters Patent of the United States is:

1. An electromagnetic clutch for coupling a pair of axially aligned rotatable shaft members which clutch comprises an annular magnet assembly to be positioned and secured around the end of a shaft and having a pair of substantially coplanar concentric coil means, said coil means having terminals for connection to an electrical voltage source and being connected thereto with the polarities arranged in such a manner that said coils conduct current in opposite directions and produce electromagnetic lines of flux of opposite rotation whereby the flux is additive between said coils and subtractive inside and outside said coils, and a plurality of individual magnetic core means having a C-shaped cross section positioned at spaced intervals around the periphery of each of said individual coil means in such a manner that their leg portions extend substantially perpendicular to the plane of said coil means whereby said legs between said coil means terminate in pole faces of one magnetic polarity and said legs both inside and outside said concentric coil means form pole faces of the opposite magnetic polarity; and an annular armature member of magnetic material positioned around the end of the other axially aligned shaft and secured thereto for limited movement in an axial direction whereby energization of said coil means causes engagement of said armature means and said electromagnet assembly.

2. An electromagnetic clutch for coupling a pair of axially aligned rotatable shaft members which clutch comprises an annular magnet assembly to be positioned and secured around the end of a shaft and having a pair of concentric coil means, said coil means having terminals for connection to an electrical voltage source and being connected thereto with the polarities arranged in such a manner that said coils conduct current in opposite directions and produce electromagnetic lines of flux of opposite rotation whereby the flux is additive between said coils and subtractive inside and outside said pair of coils, and a plurality of individual magnetic core means having a C-shaped cross section positioned at spaced intervals around the periphery of each of said individual coil means in such a manner that their leg portions extend substantially perpendicular to the plane of said coil means whereby said legs between said coil means terminate in pole faces of one magnetic polarity and said legs both inside and outside said concentric coil means terminate in pole faces of the opposite magnetic polarity; and securing means to hold said magnet assembly together; means securing said armature member to the shaft in such a manner as to allow limited rotational movement therebetween and limited axial movement of said armature relative to the shaft whereby energization of said coil means causes engagement of said electromagnet assembly and said armature means and de-energization of said coil means causes disengagement of armature means and magnetic assembly.

3. In an annular magnet assembly for use with an electromagnetic clutch, the combination of a pair of concentric coil means, said coil means having terminals for connection to an electrical voltage source and being connected thereto with the polarities arranged in such a manner that said coils conduct current in opposite directions and produce electromagnetic lines of flux of opposite rotation whereby the flux is additive between said coils and subtractive inside and outside said coils, and a plurality of individual magnetic core means having a C-shaped cross section positioned at spaced intervals around the periphery of each of said individual coil means in such a manner that their leg portions extend substantially perpendicular to the plane of said coil means whereby said legs between said coil means terminate in pole faces of one magnetic polarity and said legs both inside and outside said concentric coil means form pole faces of the opposite magnetic polarity.

4. An annular magnetic assembly for use with an electromagnetic clutch including the combination of a pair of substantially coplanar concentric coil means, said coil means having terminals for connection to an electrical voltage source and being connected thereto with the polarities arranged in such a manner as to conduct current in opposite directions and produce flux lines of opposite rotation whereby the flux is additive between said coils and subtractive both inside and outside said pair of coils, and a plurality of individual magnetic core means having a C-shaped cross section positioned at spaced intervals around the periphery of each of said individual coil means in such a manner that their individual leg portions extend substantially perpendicular to the plane of said coil means whereby the ends of said legs between said coil means form a continuous circle concentric to said coil means and terminate in pole faces of one magnetic polarity and the ends of said legs both inside and outside said coil means form interrupted circles concentric to said coil means and terminate in pole faces of a single polarity which is opposite to said one polarity, and securing means for holding said magnet assembly together.

5. The combination of a pair of spaced-apart concentric rings of non-magnetic material, a pair of concentric magnetic circuits disposed in said spaced concentric rings, each of said concentric magnetic circuits including a plurality of individual core members having a C-shaped cross section, said core members being arranged with their leg portions extending perpendicular to the plane of said concentric rings of non-magnetic material and forming an inner and outer concentrically arranged series of core members, and a pair of electric coil members one of said coil members cradled within said outer series of C-shaped core members and the other one of said coil members cradled within said inner ring of C-shaped core members, and a non-conducting plastic compound filling the area between said spaced-apart concentric rings of non-magnetic material to bond said core members and said coil member therein to provide a composite annular magnet assembly.

References Cited in the file of this patent

UNITED STATES PATENTS

| | | |
|---|---|---|
| 905,797 | Davis | Dec. 1, 1908 |
| 1,126,374 | Breth | Jan. 26, 1915 |
| 1,137,804 | Sperry | May 4, 1915 |
| 1,481,655 | Thompson | Jan. 22, 1924 |
| 2,254,625 | Ryba | Sept. 2, 1941 |
| 2,353,750 | Oetzel | July 18, 1944 |
| 2,523,772 | McGibbon et al. | Sept. 26, 1950 |
| 2,848,085 | Mannaioni | Aug. 19, 1958 |

FOREIGN PATENTS

| | | |
|---|---|---|
| 11,091 | Great Britain | Aug. 18, 1887 |
| 4,718 | Great Britain | Mar. 26, 1915 |